May 7, 1963 MASAO HORINO 3,089,060
DISCHARGE TUBE BLINKING SIGNAL DEVICE
Filed March 31, 1961 2 Sheets-Sheet 1
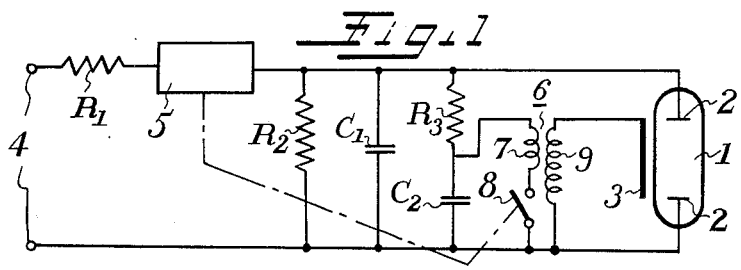
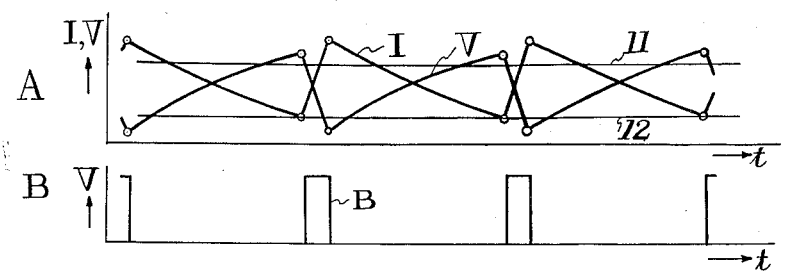
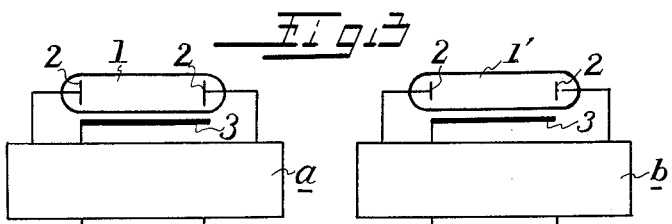
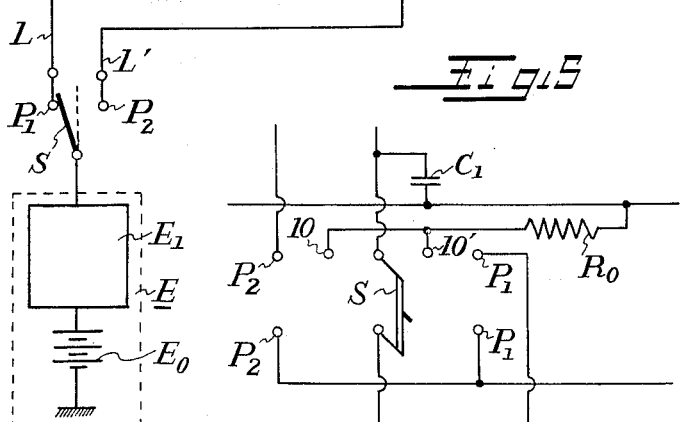
Inventor
Masao Horino
by Hill, Sherman, Meroni, Gross & Simpson
Attys.

May 7, 1963  MASAO HORINO  3,089,060
DISCHARGE TUBE BLINKING SIGNAL DEVICE
Filed March 31, 1961  2 Sheets-Sheet 2
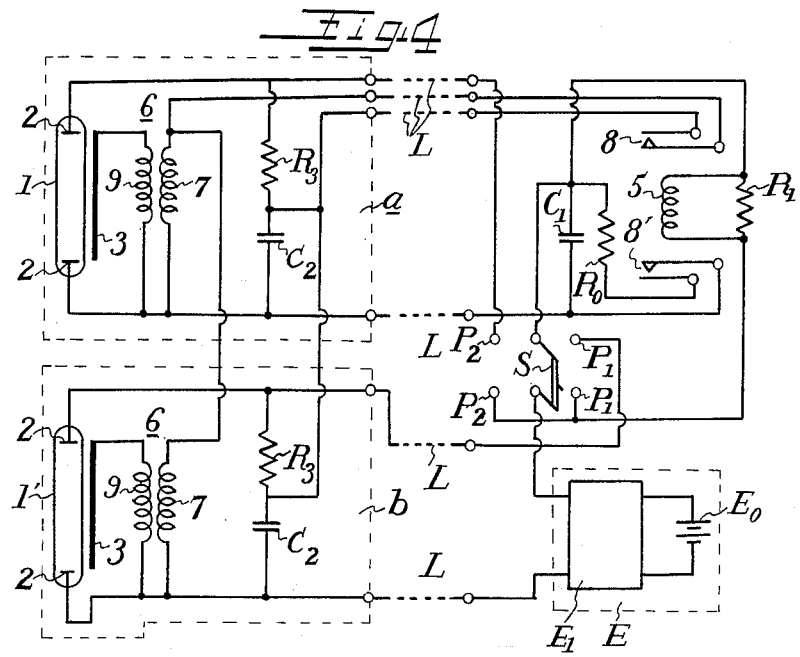
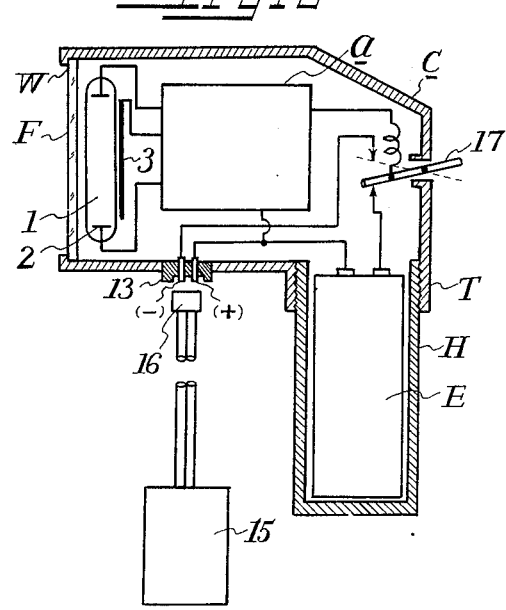
Inventor
Masao Horino United States Patent Office 3,089,060
Patented May 7, 1963

3,089,060
DISCHARGE TUBE BLINKING SIGNAL DEVICE
Masao Horino, 81 Nakane-cho, Meguro-ku, Tokyo, Japan
Filed Mar. 31, 1961, Ser. No. 99,734
Claims priority, application Japan Dec. 15, 1960
2 Claims. (Cl. 315—224)

This invention relates to a discharge tube blinking signal device, and more particularly to an efficient blinking signal device using an xenon gas discharge tube with xenon gas enclosed therein.

One object of this invention is to provide a discharge tube blinking signal device in which an xenon gas discharge tube having superior blinking effect is utilized.

Another object of this invention is to provide a blinking signal device fully distinguishably visible even under the direct sun beam in the daytime.

A further object of this invention is to provide a blinking control device which makes it possible to blink an xenon gas discharge tube stably with a proper and desirable period.

A still further object of this invention is to provide an effective blinking traffic indicator or car blinker with an xenon gas discharge tube or tubes employed therein.

Another object of this invention is to provide a portable discharge tube signal blinking device of superior blinking effect.

Other objects, features and advantages of this invention will become fully apparent from the following description taken in connection with the accompanying drawings, in which FIGURE 1 is a connection diagram of a discharge tube blinking signal device using an xenon discharge tube according to this invention;

FIGURE 2 shows curves for explaining the operation of the device shown in FIG. 1, FIGURE 3 is a system diagram illustrating one example of this invention applied to a car blinker;

FIGURE 4 is a connection diagram illustrating another example of a car blinker according to this invention;

FIGURE 5 is a partial view of the diagram shown in FIG. 4; and

FIGURE 6 shows a sectional view illustrating a portable discharge tube blinking signal device and a schematic connection diagram attached.

I will hereinafter explain one example of this invention. 1 is an xenon discharge tube with an xenon gas enclosed therein, 2 shows main electrodes and 3 a trigger electrode. Generally the xenon discharge tube flashes in high velocity and intervals of the flashes are perceived distinctly. The character of the light beam may be distinguished clearly from other kinds of light beam even under the direct sun beam in the daytime and the brightness of the flash is very strong, so that the xenon discharge tube has very excellent characteristics as a blinking signal lamp. Giving consideration to this point, this invention is intended to provide a signal device wherein the xenon discharge tube is blinked reliably and stably with comparatively low periods and thereby bringing the features into full play. 4 is a direct current power source, which has such a high voltage suitable for discharging of the xenon tube for example as above 100 volts, but various heretofore known power source devices may be employed for obtaining this voltage. In case of using an ordinary commercial alternating current power source, for instance, a well known voltage multiplier consisting of rectifiers and capacitors may be utilized. Further, in case where a battery of low voltage such as 6 volts, 12 volts, 24 volts or the like is used as the power source, an objective direct current power source can be equipped by using an appropriate converter.

In this invention, to a power source 4 is connected in series a time constant circuit consisting of a resistor $R_1$ and a capacitor $C_1$ in series thereto. The capacitor $C_1$ is charged through the resistor $R_1$, and in a point where the charging current passes to the capacitor $C_1$ is inserted a relay 5, a usually open contact point 8 of which is inserted to a primary coil 7 of a transformer 6 of a trigger circuit connected in parallel to the capacitor $C_1$ and to a secondary side of the transformer 6 is connected a trigger electrode 3 of the xenon discharge tube 1. $R_3$ is a resistor which makes a primary side current of the transformer 6 proper and $C_2$ shows a capacitor for erasing sparks which will occur at the contact point 8 when it is opened and closed. Furthermore, in this invention a bias resistor $R_2$ is connected in parallel to the capacitor $C_1$ at the opposite side of the power source with respect to the relay 5, by which a current passing through the relay 5 is properly controlled so that the discharge period may be adjusted.

The operations of the aforesaid device according to this invention are as follows. When a current is applied from the power source 4 to the relay 5 through the resistors $R_1$ and $R_2$, the capacitor $C_1$ begins to charge through the relay 5 at the same time. The charging current is as shown by a curve I in FIG. 2, by which current the contact point 8 is left open. As a time elapses, however, the charged voltage of the capacitor $C_1$ rises up to a certain value as shown by a curve V in FIG. 2, namely to a voltage high enough to discharge the xenon discharge tube. At this time, on the contrary, a current I passing through the relay 5 decreases gradually to a lowest value so that the contact point 8 is closed. Accordingly, when a current flows through the resistor $R_3$ and the primary side of the transformer 6 and a pulse of the secondary side 9 shown by a curve B in FIG. 2B is impressed to the trigger electrode 3, the xenon tube 1 discharges in an instant with a charging voltage stored in the capacitor $C_1$. At this moment, the charging current flows again through the relay 5 from the power source, and then the contact point 8 opens. Being thus controlled by the relay 5, the discharge tube may perform the flashing discharge at a certain period determined by the time constant circuit. In this case, if the current flowing through the relay 5 is adjusted by controlling the value of the resistor $R_2$ properly, the flashing period may be adjusted appropriately. That is, when a line 11 parallel to the time axis $t$ is made a current level where the relay 5 operates and the other parallel line 12 is a current level when the relay 5 turns off, the levels are properly changed by the resistor $R_2$, whereby the aforementioned flashing period of the discharge tube may be adjusted.

According to this invention, as above described, by utilizing the previously explained feature of the light beams of the xenon discharge tube, the discharge tube is stably and reliably flashed by a small power consumption with such a low period as unattainable by an ordinary time constant circuit and that in a simple construction. Therefore, this invention is very advantageous applied to traffics, other simple communication or delivery and receipt of a signal with light beams.

A numerical example of the discharge tube signal device is as follows:

$C_1 = 30$ microfarads
$R_1 = 15$ kilo-ohms, the flashing period is 2 seconds;
$R_1 = 8$ kilo-ohms, the flashing period is 1.5 seconds;
$R_1 = 0$, the flashing period is 1 second.

FIG. 3 shows one example of this invention applied to a traffic indicator or car blinker which performs direction indication very easily and clearly with a small power consumption. In the figure, 1 and 1' are xenon discharge tubes disposed in the front or back sides of a car. Blinking control circuits $a$ and $b$ previously described referring to FIG. 1 are provided to each of the discharge tubes. The blinking control circuits are made to operate by switching a common power source E, namely to this end the respective circuits $a$ and $b$ are connected to change-over contact points $P_1$ and $P_2$ through leading wires L and L', and then the circuits are changeably switched to the power source E with an operation of a change-over switch S. That is, the power source E consists of a storage battery $E_0$ disposed in a car and a well known converter $E_1$. Although the battery has such differences as 6 volts, 12 volts, 24 volts or the like according to a standard, in short a low voltage direct current source is converted into a high voltage direct current source by the converter $E_1$, which voltage is delivered to the respective control circuits $a$ and $b$ by means of the change-over switch S. When the change-over switch S is in an intermediate position shown by a dotted line, the power source is not supplied to the control circuits, hence the both circuits do not operate. If, however, the change-over switch is switched to either circuit of the two, a current is supplied to the switched circuit, by which the corresponding xenon discharge tube is made to perform flashing operations with a predetermined period.

FIG. 4 is another example of this invention applied to a traffic indicator, wherein the xenon discharge tubes 1 and 1' are disposed right and left on the front or back part of a car, to which tubes are respectively associated the blinking control circuits $a$ and $b$ similarly to the preceding example. The blinking control circuits are made to operate by switching a common power source E, that is, to this end, the respective circuits $a$ and $b$ are connected to change-over contact points $P_1$ and $P_2$ through a leading wire L and the circuits are changeably switched to the power source E with an operation of a change-over switch S. Namely, the power source E is composed of a storage battery $E_0$ provided in a car and a converter $E_1$ as previously described. Although the battery has such differences as 6 volts, 12 volts, 24 volts or the like according to a standard, in short a low voltage direct source is converted into a high voltage direct current source by the converter $E_1$, which currents are delivered to the respective control circuits $a$ and $b$ by means of the change-over switch S. When the change-over switch is in an intermediate position, the power source is not supplied to the control circuits, hence the both circuits do not operate. But if the change-over switch is switched to either one of the two, a current is delivered to the switched circuit, by which the corresponding xenon discharge tube is made to perform flashing operations with a predetermined period. Since the control circuits $a$ and $b$ and their operations will easily be understood from the descriptions taken in connection with FIGS. 1 and 2, the corresponding parts are marked with the same numerals and further descriptions are omitted for the sake of simplicity.

As above described, the respective right and left xenon discharge tubes blink with a predetermined period by switching the change-over switch S and thereby performing direction indication. However, after one discharge tube is operated by switching the change-over switch S, when the other discharge tube is, in turn, operated, a charge of the capacitor $C_1$ has not been as yet discharged completely, hence there is a fear that the relay 5 to be operated is kept non-operative due to the changing current. In this example, however, the capacitor $C_1$ is made to discharge during the switching operation of the change-over switch S so as to avoid such a defect. To this end, in FIG. 4 the positive side of the capacitor $C_1$ is connected to the negative side, namely to the earth through the remaining contact point 8' of the relay 5 and the resistor $R_0$.

FIG. 5 shows its modified connection, wherein the movable part of the change-over switch S is once touched with an auxiliary contact point 10 or 10' and then finally switched to contact to contact point $P_1$ or $P_2$. If the auxiliary contact point 10 or 10' is earthed through the resistor $R_0$, the same operations are performed so that the purpose may be achieved.

FIG. 6 is another example of this invention applied to a portable discharge tube blinking signal device. In the figure, $c$ shows a casing, at the front of which is formed a window W in which a transparent material or a desired color filter F is fitted. In the casing, the aforesaid xenon discharge tube 1 is provided and the blinking control circuit $a$ for blinking the tube with a desired period previously described referring to FIG. 1 is also disposed. Furthermore, at the back lower part of the casing C is fitted a handle H with a power source E enclosed therein by screw means T. As the power source E, such a power source having a necessary voltage large enough to discharge the xenon discharge tube as that of 130 volts or the like is employed. But another power source connection part 13 may preferably be provided in order to use an external direct current source such for example as being supplied from an electric lamp power circuit, other dry battery or other direct current source which is obtained by rectifying a high voltage step-up alternating current which is delivered from a low voltage battery by a converter, instead of the battery E.

The connection is preferable of a plug-jack type, for instance, at the bottom of the casing is provided a jack 14, in which a plug 16 connected to an external power source 15 is inserted. As the external power source 15, a layer battery different from the E or an ordinary commercial frequency power source which is boosted and rectified may be used and such a battery as 6 volts, 12 volts, 24 volts which is boosted and rectified by a converter may also be utilized. In order to change-over the power sources E and 15, in the casing C is provided a change-over switch 17, which is made to be operated from the outside. That is, when the change-over switch 17 is under the state shown in the FIG. 6, the layer battery E in the handle H is used and when switched as shown in the dotted line, the above mentioned external power source 15 may be employed.

According to this invention as has been described, in a very simple and small casing are provided the xenon discharge tube, the power source and the discharge control circuit, by which the xenon discharge tube may be flashed at predetermined periods. Namely the excellent discharge characteristic and the blinking visual characteristic of the xenon discharge tube are thus utilized, whereby the blinking may be fully recognized under the direct sun beam and distinguished from other rays. Accordingly, this invention is very advantageously applied to a traffic signal, other signal device or other devices generally called as blinkers.

It will be understood that modifications and variations may be effected without departing from the scope of the novel conceptions of this invention.

What is claimed is:

1. A flashing device comprising a gas discharge tube including a pair of electrodes and a triggering electrode, a direct current power source of sufficient voltage to cause conduction of said gas discharge tube, a capacitor connected to said power source and arranged to be charged thereby, a resistor in series with said capacitor, said capacitor being connected across said pair of electrodes of said discharge tube, a relay coil in series with said resistor, a biasing resistor in parallel circuit relationship with said capacitor, said resistor, said capacitor, said relay coil, and said biasing resistor providing a charging circuit of predetermined time constant, a triggering circuit including pulse transmitting means connected to said triggering electrode, and a relay contact initiating operation of said triggering circuit, said contact being isolated from the pair of electrodes in said tube and being responsive to current variations in said relay coil to actuate said triggering circuit and thereby flash said gas discharge tube.

2. The device of claim 1 in which said triggering circuit includes a transformer whose secondary is connected to said triggering electrode and in which said relay contact is in series with the primary of said transformer.

References Cited in the file of this patent

UNITED STATES PATENTS

| | | |
|---|---|---|
| 2,208,125 | Feingold | July 16, 1940 |
| 2,492,142 | Gerneshausen | Dec. 27, 1949 |
| 2,624,831 | Farber | Jan. 6, 1953 |
| 2,628,331 | Rockafellow | Feb. 10, 1953 |
| 2,718,601 | Oliwa | Sept. 20, 1955 |
| 2,887,592 | Stout et al. | May 19, 1959 |

FOREIGN PATENTS

| | | |
|---|---|---|
| 864,807 | Germany | Jan. 29, 1953 |